March 10, 1953     E. F. POWELL     2,630,648

FISH LURE

Filed May 31, 1949

Inventor

Everett F. Powell

By Clarence A. O'Brien
and Harvey B. Jacobson
Attorneys

Patented Mar. 10, 1953

2,630,648

UNITED STATES PATENT OFFICE 2,630,648

FISH LURE

Everett F. Powell, Greenville, Ill., assignor of fifty per cent to Herbert S. Powell, Sandoval, Ill.

Application May 31, 1949, Serial No. 96,276

4 Claims. (Cl. 43—42.09)

This invention relates to fish lures of the type embodying a chassis, and a lure body removably carried by said chassis, whereby any one of a plurality of differently designed lure bodies may be selectively or interchangeably used with the chassis to provide a lure best suited to existing fishing conditions.

An object of the invention is to provide a lure of the above kind in which the lure body may be easily and quickly assembled to or removed from the chassis.

Another object is to provide a lure of the above type wherein the lure body is tapered, and wherein the chassis includes a hook-carrying base member having a tapered sleeve secured thereon into which a portion of the body is adapted to be frictionally wedged.

A further object is to provide the lure body with a colored or decorated portion to be received in the sleeve, and to provide a sleeve which is transparent so that said body portion will show therethrough.

Still another object is to provide the transparent sleeve with outwardly embossed portions which are colored on their inner buoyant plug-like surfaces to represent the eyes of the bait represented by the lure.

A still further object is to provide a lure of the above kind which is simple in construction, inexpensive to manufacture, and otherwise well adapted to its intended purpose.

The exact nature of the present invention, as well as other objects and features thereof, will become apparent from the following description when considered with the accompanying drawings, in which.

Figure 1:
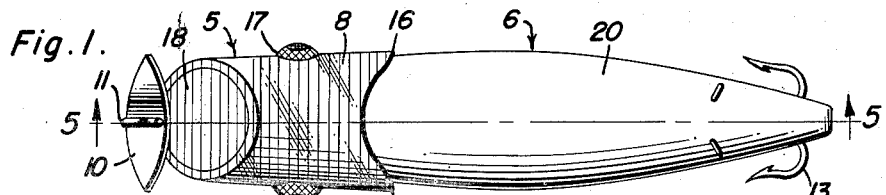
Figure 1 is a top plan view of one type of fish lure embodying the present invention.
Figure 2:
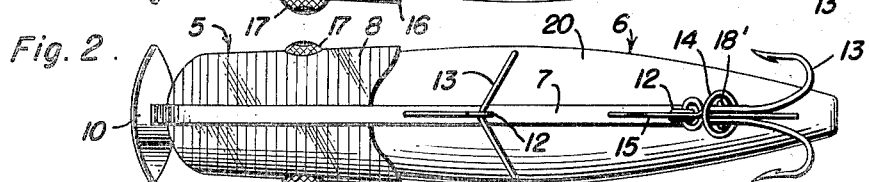
Figure 2 is a bottom plan view thereof.
Figure 3:
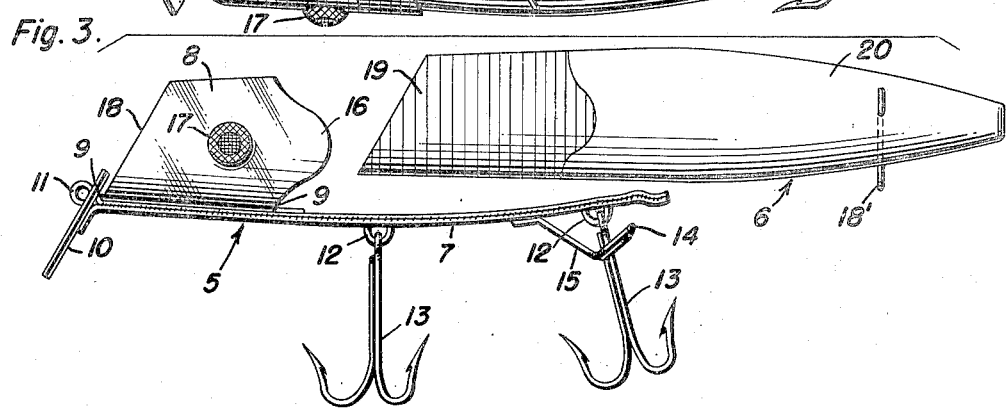
Figure 3 is an enlarged side elevational view of the same, with the lure body detached from the chassis.
Figure 5:
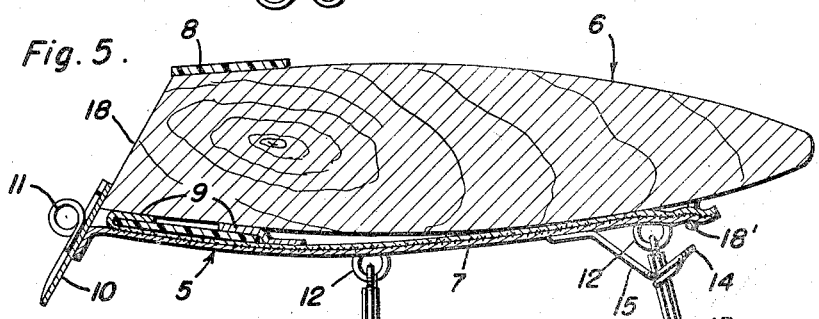
Figure 5 is an enlarged, longitudinal section taken on the line 5—5 of Figure 1.
Figure 4:
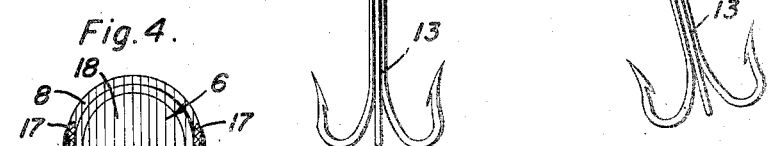
Figure 4 is an enlarged front elevational view of the lure shown in Figure 1.

Referring now to the drawings in detail wherein for the purpose of illustration, there is disclosed a preferred embodiment of the present invention. The lure is of the under water type and includes a chassis 5, and a lure body 6 removably carried thereby.

The chassis includes an elongated base member 7, preferably in the form of a narrow bar or strip and having a forwardly tapered sleeve 8 disposed longitudinally thereof and secured on the forward end portion of the same by means of bendable lips or tongues 9 carried by said member 7. A forwardly inclined diving plate 10, having a line-attaching eye 11, may be fixed on the forward end of the base member 7. Carried by and spaced longitudinally of the major rear portion of base member 7 are depending eyes 12 from each of which is pivotally hung a multiple or other type of fish hook 13. The shank of the rear hook 13 extends loosely through the eye 14 of a device 15 attached to and depending from the member 7 for limiting the movement of said rear hook so as to prevent it from becoming engaged or fouled with the front hook. The sleeve 8 is preferably made of transparent Celluloid or the like and has opposite sides of its rear end shaped at 16 to represent the gills of a minnow or the like, as well as having outwardly embossed opposite side portions 17 which are colored on their inner surfaces to represent the eyes of a minnow or the like.

The body 6 may be made of wood and is elongated, as well as having its end portions tapered toward the free ends or outer terminals thereof, to represent the body of a minnow or the like. Also, the front end 18 of said body is inclined forwardly so as to cause a diving action, assisted by the plate 10. The front end portion of body 6 is fitted and frictionally wedged into sleeve 8, and the rear end of base member 7 is engaged in and snapped behind a keeper loop 18' carried by the body. Thus, the rear end of base member 7 is held against the bottom of the body, and the body and chassis are effectively held in assembled relation. By forcing the body rearwardly relative to the chassis, loop 18' may be disengaged from base member 7 and the body may be slid out of sleeve 8. The body 6 is suitably decorated in one or more colors, and the color or colors at the sleeve 8 can be seen through the latter. As shown, the forward portion 19 is colored red, and the rear portion 20 is of a different color, such as white. In practice, several interchangeable and differently designed and decorated lure bodies are provided for selective use with the chassis, the eyes for all bodies being those of sleeve 8 at 17.

From the foregoing description, the nature and advantages of the present invention will be readily understood and appreciated by those skilled in the art. Further modifications and changes in details of construction are contemplated within the spirit and scope of the invention as claimed.

What is claimed as new is:

1. A fish lure including a base strip, a tapered transparent sleeve disposed longitudinally of and removably secured on said base strip, a buoyant plug-like lure body having a tapered portion removably fitted and frictionally wedged in said sleeve against the inner wall of said sleeve and having its surface decorated, a fish hook attached to said base strip and bendable tongues secured to said base strip and engaging and holding the ends of the sleeve against the base strip, said tapered portion also frictionally wedging against said tongues.

2. A fish lure comprising an elongated relatively narrow base strip having forward and rear end portions, a forwardly tapered sleeve disposed longitudinally of said strip and overlying the forward end portion of said strip, tongues carried by the forward end portion of said strip engaging the inner periphery of the sleeve at each end thereof to hold the sleeve against the strip, an elongated lure body having a forwardly tapered, smooth surfaced front end frictionally urged in said sleeve and against said tongues to aid in retaining the tongues against the inner periphery of said sleeve, and means releasably securing the rear end portion of said strip to the rear end of said body.

3. A fish lure comprising an elongated relatively narrow base strip having forward and rear end portions, a forwardly tapered sleeve disposed longitudinally of said strip and overlying the forward end portion of said strip, said strip including upper and lower layers of material, the forward end of the upper layer terminating in a forward hook portion engaging the forward end and inner periphery of the sleeve, a tongue secured to the upper layer and including an offset portion entering the rear end of the sleeve and engaging the inner periphery of the sleeve to coact with the hook portion in holding the sleeve on the strip, an elongated lure body having a forwardly tapered end portion frictionally wedged in said sleeve and against said hook portion and said offset portion, and means releasably securing the rear end portion of said strip to the rear end of said body.

4. A fish lure comprising an elongated relatively narrow base strip having forward and rear end portions, a forwardly tapered sleeve disposed longitudinally of said strip and overlying the forward end portion of said strip, said strip including upper and lower layers of material, the forward end of the upper layer terminating in a forward hook portion engaging the forward end and inner periphery of the sleeve, a tongue secured to the upper layer and including an offset portion entering the rear end of the sleeve and engaging the inner periphery of the sleeve to coact with the hook portion in holding the sleeve on the strip, an elongated lure body having a forwardly tapered end portion frictionally wedged in said sleeve and against said hook portion and said offset portion, and an eye secured to and depending from the rear end of said body adapted to slidably receive the rear end portion of said strip as the forward end of the body is manually forced into the sleeve, whereby the forward and rear ends of the body will be removably secured to the strip.

EVERETT F. POWELL.

REFERENCES CITED

The following references are of record in the file of this patent:

UNITED STATES PATENTS

| Number | Name | Date |
|---|---|---|
| 353,470 | Shafer | Nov. 30, 1886 |
| 687,891 | Larson | Dec. 3, 1901 |
| 1,204,204 | Strube | Nov. 7, 1916 |
| 1,435,177 | Peckinpaugh | Nov. 14, 1922 |
| 1,599,763 | Head | Sept. 14, 1926 |
| 1,608,375 | Dewey | Nov. 23, 1926 |
| 1,740,335 | Cowan | Dec. 17, 1929 |
| 1,807,283 | Dick | May 26, 1931 |
| 2,228,591 | Brown | Jan. 14, 1941 |
| 2,278,876 | Hart | Apr. 7, 1942 |
| 2,546,772 | Neff | Mar. 27, 1951 |